March 8, 1960 W. R. POLANIN 2,927,662
MANUAL AND FLUID PRESSURE RAILWAY BRAKE
Filed Jan. 9, 1956
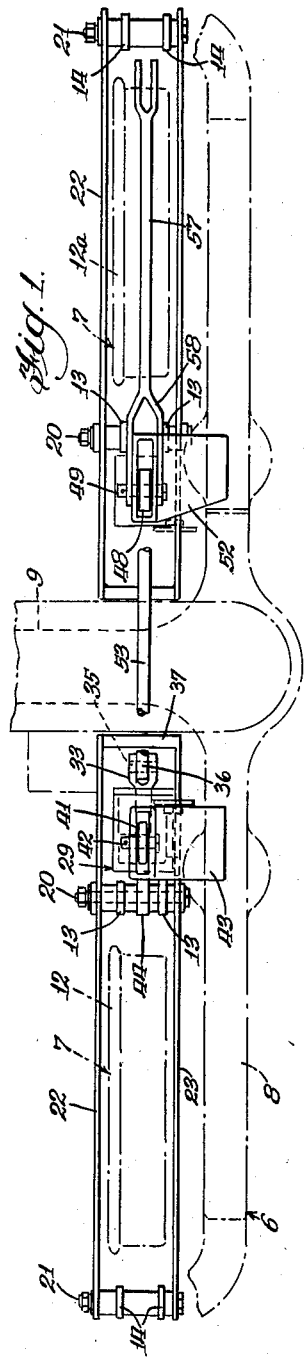
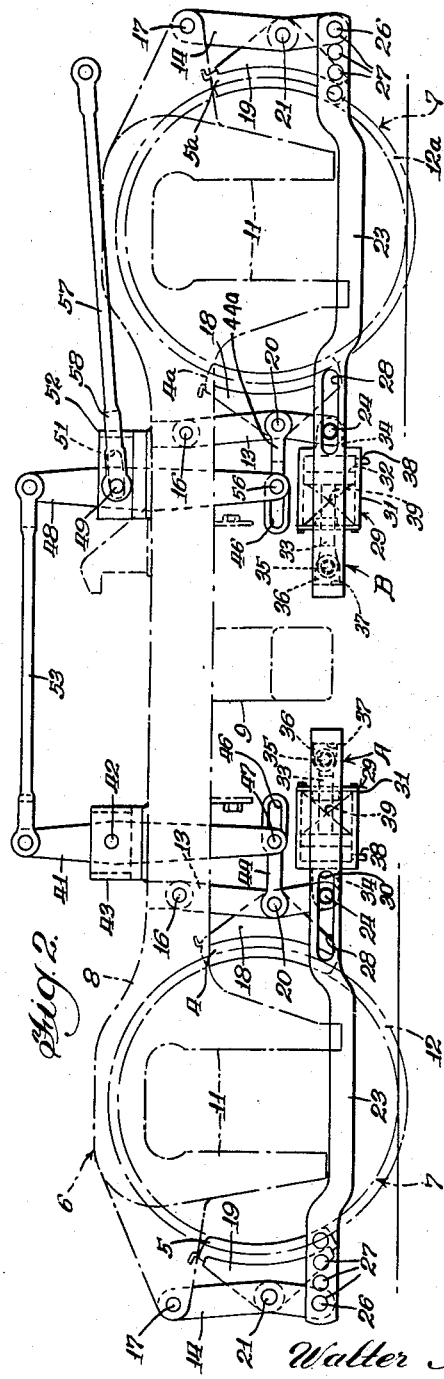
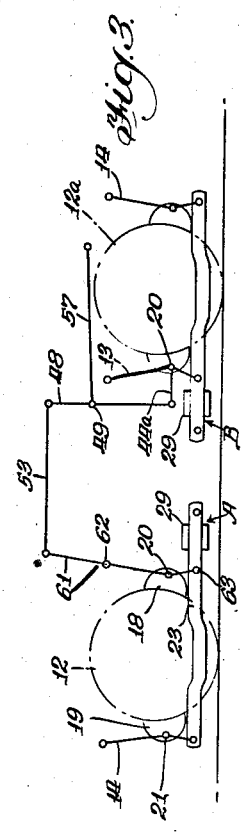
INVENTOR.
Walter R. Polanin
BY
Walter S. Schlegel, Jr.
Atty.

United States Patent Office 2,927,662
Patented Mar. 8, 1960

2,927,662

MANUAL AND FLUID PRESSURE RAILWAY BRAKE

Walter R. Polanin, Chicago, Ill., assignor to American Steel Foundries, Chicago, Ill., a corporation of New Jersey Application January 9, 1956, Serial No. 557,921

6 Claims. (Cl. 188—56)

This invention relates to brake arrangements for railway car trucks and more particularly to a combined brake arrangement including manual and power brake rigging independently operable to apply brake shoes to wheel tread surfaces.

An object of the invention resides in the provision of a relatively simple, inexpensive and reliable brake arrangement in which a hand brake rigging is associated with a power clasp brake rigging to selectively apply the brake shoes to the wheels.

Another object of the invention resides in the provision of a combined manual and power brake arrangement for a four wheel truck, each wheel being provided with an independent power actuated clasp brake rigging to apply two brake shoes to opposite sides of a wheel tread surface, the two wheels on one side of the truck being provided with a hand brake rigging operable to apply one shoe to each wheel.

The invention embodies other novel features, details of construction and arrangement of parts which are hereinafter set forth in the specification and claims and illustrated in the accomanying drawings wherein:

Figure 1 is a fragmentary top plan view showing a brake arrangement embodying features of the invention, the brake arrangement being shown as applied to one side of a four wheel railway car truck.

Figure 2 is a side elevational view of same.

Figure 3 is a schematic view illustrating a modified form of the invention.

Referring now to the drawing for a better understanding of the invention and more particularly to Figures 1 and 2 thereof the brake arrangement is shown as applied to a four wheel railway car truck comprising a frame 6 supported upon wheel and axle assemblies 7—7, the frame being shown as comprising side frame members 8—8 interconnected by a transverse member 9. Each side frame 8 is provided with pedestals 11—11 to receive journal boxes (not shown) in which the ends of the wheel and axle assemblies are journaled.

Each side of the four wheel truck is provided with two power actuated clasp brake arrangements, indicated at A and B. As these arrangements are identical in construction and operation, the following description of one arrangement applies to the other arrangements and corresponding numbers have been applied to corresponding parts in the the drawings.

Each power actuated brake arrangement is shown as comprising pairs of inner and outer hangers 13—13 and 14—14, respectively, pivotally connected at their upper ends to the side frame member 8. Brake heads 18 and 19 are pivotally mounted between their associated pair of hangers by means of bolts 20 and 21, respectively, the bolts also acting to frictionally engage the hangers against opposite sides of their respective brake heads to normally engage the latter against accidental pivotal movement relative to their hangers. Conventional brake shoes 4 and 5 are detachably secured to their respective brake heads 18 and 19 to frictionally engage opposite sides of the wheel to decelerate the assembly 7.

Inboard and outboard tie members 22 and 23, respectively, extend along opposite sides of the wheel 12 and are connected to the lower ends of the hangers 13 and 14, below the brake heads 18 and 19, by means of pivot members 24 and 26. The tie members are formed with sets of axially aligned apertures 27 in which the pivot member 26 may be selectively positioned. The tie members are also formed with longitudinally extending slots 28 to slidably receive the ends of the pivot member 24.

A power device 29 operated by fluid under pressure is provided to actuate the clasp brake arrangement and is shown as comprising a cylinder 31, a piston 32 and a piston rod 33. The cylinder 31 is provided with an arm 34 formed with an aperture 30 to snugly receive the pivot member 24. The outer end of the piston rod 33 is pivotally mounted on a pin 35 provided on a bracket 36 which is welded to a spacer 37 interconnecting adjacent ends of the tie members 22 and 23.

In the operation of the clasp brake arrangement to decelerate the wheel and axle assembly 7, pressure fluid is directed through a conduit 38 into the cylinder 31 to move the cylinder and piston in opposite directions whereby the shoes 4 and 5 are moved toward and frictionally engage opposite sides of the wheel 12. Responsive to a drop in fluid pressure in the cylinder, a compression spring 39 interposed between the piston and cylinder acts to return the several parts of the rigging to their normal inoperative positions.

A manually operable brake arrangement is provided on each side frame member 8 to move the brake shoes 4 and 4a of the brake arrangements A and B, respectively, into frictional engagement with their associated wheels 12 and 12a. This manually operable brake arrangement is shown as comprising a vertical dead actuating lever 41 pivotally mounted intermediate its ends at 42 on a bracket 43 secured on the side frame member 8. A push rod 44 is pivotally connected at one end thereof to the bolt 20, the other end of the rod being bifurcated to straddle the lower end of the lever 41 and formed with longitudinally extending slots 46 to slidably receive the ends of a pin 47 mounted on the lower end of the lever 41.

A vertical live actuating lever 48 is provided with a pin 49 having its ends slidably mounted in slots 51 formed in a bracket 52 secured on the side frame member 8. The upper ends of the actuating levers 41 and 48 are interconnected by a connecting link 53, and the lower end of the live actuating lever 48 is provided with a pin 56 slidably mounted in slots 46 formed in a push rod 44a. A pull rod 57 is provided with a bifurcated end having coaxial apertures to receive the ends of the pin 49. The other end of the pull rod 57 is adapted to be connected to any conventional manually operable mechanism to actuate the hand brake arrangement.

In the operation of the hand brake arrangement, the pull rod 57 acts through the live lever 48 and push rod 44a to move its associated shoe 4a into frictional engagement with the wheel 12a and, simultaneously therewith, acts through the link 53, dead lever 41 and push rod 44 to move the brake shoe 4 into frictional engagement with the wheel 12.

Figure 3 in the drawing illustrates a modified form of the invention in which the hangers 13—13 and push rod 44 are omitted from the power brake arrangement A. In this form of the invention, a dead actuating lever 61 is pivotally mounted at 62 on the side frame member 8 with its upper end interconnected to the live actuating lever 48 by the connecting link 53. A pin 63 is provided on the lower end of the lever 61 for slidable engagement in the slots 28 provided in the tie members 22 and 23. The lever 61 is also pivotally connected to the brake head 18 by the bolt 20. This form of the invention is otherwise similar to the form heretofore described.

In each form of the invention it will be noted that the hand brake arrangement is operable independently of the two power brake arrangements associated therewith and vice versa, due to lost-motion connections therebetween.

I claim:

1. In a combined hand and power brake arrangement for two wheels at one side of a four wheel railway car truck, a side frame, a clasp brake structure for each wheel comprising inner and outer hangers pivotally suspended from said frame on opposite sides of its associated wheel, brake head-shoe assemblies pivotally mounted on said hangers, tie means interconnecting the lower ends of said hangers and including a power cylinder mounted on the tie means operable to move said assemblies against opposite sides of the wheel, and a hand brake rigging interconnecting the inner hangers of said clasp brake structures to engage their respective assemblies against their respective wheels, said hand brake rigging comprising a vertical live actuating lever supported by said frame, a vertical dead actuating lever pivotally mounted intermediate its ends on said frame, said live and dead levers having their lower ends connected to their respective inner hangers by lost motion connections, a connecting link interconnecting the upper ends of said levers, and hand operable means including an operating rod connected to one of said levers, said hand brake rigging being operable to actuate said inner hangers.

2. In a combined hand and power brake arrangement for two wheels at one side of a four wheel railway car truck, a side frame, a clasp brake structure for each wheel comprising inner and outer hangers pivotally suspended from said frame on opposite sides of its associated wheel, brake head-shoe assemblies pivotally mounted on said hangers, tie means interconnecting the lower ends of said hangers and including a power cylinder mounted on the tie means operable to move said assemblies against opposite sides of the wheel, and a hand brake rigging interconnecting the inner hangers of said clasp brake structures to engage their respective assemblies against their respective wheels, said hand brake rigging comprising a vertical live actuating lever operably supported by said frame, a vertical dead actuating lever pivotally mounted intermediate its ends on said frame, said live and dead actuating levers having their lower ends connected to their respective inner hangers by lost motion connections, a connecting link interconnecting the upper ends of said levers, and hand operable means including an operating rod connected to said live actuating lever intermediate the ends thereof, the outer hangers being inoperable at times of actuation of said hand brake arrangement.

3. A brake arrangement according to claim 2 in which lost-motion connecting means are provided between said actuating levers and their associated inner hangers.

4. A brake arrangement according to claim 2 in which said tie means includes lost-motion means whereby said brake arrangements are independently operable.

5. In a combination power and hand brake arrangement for two wheels at one side of a four-wheel railway car truck, brake shoes disposed on opposite sides of each of said wheels, two pairs of inner and outer hangers pivotally carrying respective brake shoes intermediate the ends of said hangers, said hangers being pivotally mounted to said railway truck at their upper ends; said hand brake arrangement comprising a live and a dead actuating lever pivotally supported by said truck, said live and dead actuating levers being pivotally connected to said inner hangers, said pivotal connections comprising tie means including lost-motion connections, and means for actuation of said hand brake arrangement; said power brake arrangement comprising power cylinders mounted on the tie means each operably connected to the lower end of one hander of one pair, and other tie means interconnecting each power cylinder to the other hanger of the related pair; said hand brake arrangement being operative to actuate the inner hangers; said power brake arrangement being operative to actuate the inner and outer hangers.

6. In a combination power and hand brake arrangement for two wheels at one side of a four-wheel railway car truck, a side frame, a clasp brake structure for each wheel comprising inner and outer hangers pivotally suspended from said frame on opposite sides of its associated wheel, brake head shoe assemblies pivotally mounted on said hangers, and tie means interconnecting the respective inner and outer hangers; said power brake arrangement comprising a power cylinder mounted on the tie means operably connected to said inner and outer hangers for actuation thereof; said hand brake arrangement comprising a live and dead actuating lever pivotally supported by said frame and operably connected to the inner hangers by lost motion connections, the pivotal connection for said live actuating lever comprising a pin, a bracket secured to said frame, and an inclined slot in said bracket, said pin being disposed in said inclined slot, said live actuating lever being vertically displaced upon actuation thereof, and means for actuation of said hand brake arrangement.

References Cited in the file of this patent

UNITED STATES PATENTS

| | | |
|---|---|---|
| 1,531,284 | Hedgcock | Mar. 31, 1925 |
| 2,064,367 | Baselt | Dec. 15, 1936 |
| 2,112,530 | Holloway | Mar. 29, 1938 |
| 2,191,138 | Baselt | Feb. 20, 1940 |
| 2,543,326 | McGowan | Feb. 27, 1951 |